United States Patent [19]

Hamilton et al.

[11] Patent Number: 5,063,712

[45] Date of Patent: Nov. 12, 1991

[54] MICRO-BURNISHING FLEX HEAD STRUCTURE

[75] Inventors: Harold J. Hamilton, Santa Clara; Leonard E. Harr, San Jose, both of Calif.

[73] Assignee: Censtor Corp., San Jose, Calif.

[21] Appl. No.: 503,276

[22] Filed: Apr. 2, 1990

[51] Int. Cl.$^5$ ............ B24B 39/06; B24B 7/04; B21C 37/30
[52] U.S. Cl. ............ 51/67; 51/154; 51/161; 51/281 SF; 51/204; 29/90.01
[58] Field of Search ............ 51/132, 131.3, 131.4, 51/204 R, 281 SF, 161, 57, 58, 154, 67; 29/90.01, 90.1

[56] References Cited

U.S. PATENT DOCUMENTS

| | | | |
|---|---|---|---|
| 4,241,368 | 12/1980 | Tadokoro et al. | 360/128 |
| 4,330,910 | 5/1982 | Schachl et al. | 29/90.01 |
| 4,384,311 | 5/1983 | McNeil | 360/128 |
| 4,698,251 | 10/1987 | Fukuda et al. | 428/64 |
| 4,761,874 | 8/1988 | Utsui | 29/527.2 |
| 4,845,816 | 7/1989 | Nanis | 29/90.01 |
| 4,870,524 | 9/1989 | Coe | 360/135 |

FOREIGN PATENT DOCUMENTS

| | | | |
|---|---|---|---|
| 0081058 | 5/1984 | Japan | 29/90.01 |
| 0207765 | 10/1985 | Japan | 29/90.01 |
| 0061762 | 3/1986 | Japan | 51/131.3 |
| 0156656 | 6/1988 | Japan | 29/90.01 |
| 0103255 | 4/1989 | Japan | 51/131.3 |

OTHER PUBLICATIONS

Magnetic Disk Treatment; H. V. Barth, et al., IBM Technical Disclosure Bulletin vol. 14, No. 5, Oct. 1971.

*Primary Examiner*—Robert A. Rose
*Attorney, Agent, or Firm*—Kolisch, Hartwell, Dickinson, McCormack & Heuser

[57] ABSTRACT

An integrated unitary micro-burnishing head structure for use with the surface of rigid magnetic recording media. In one type of embodiment, the proposed head structure includes a single elongate flexure body to one end of which is joined a media-contacting abrader head which may take any one of several different preferred shapes. In another embodiment, plural elongate flexure bodies are disposed in a comb-like array carrying abrader heads at one set of free ends, and joined adjacent their opposite ends through a common joinder structure.

27 Claims, 3 Drawing Sheets

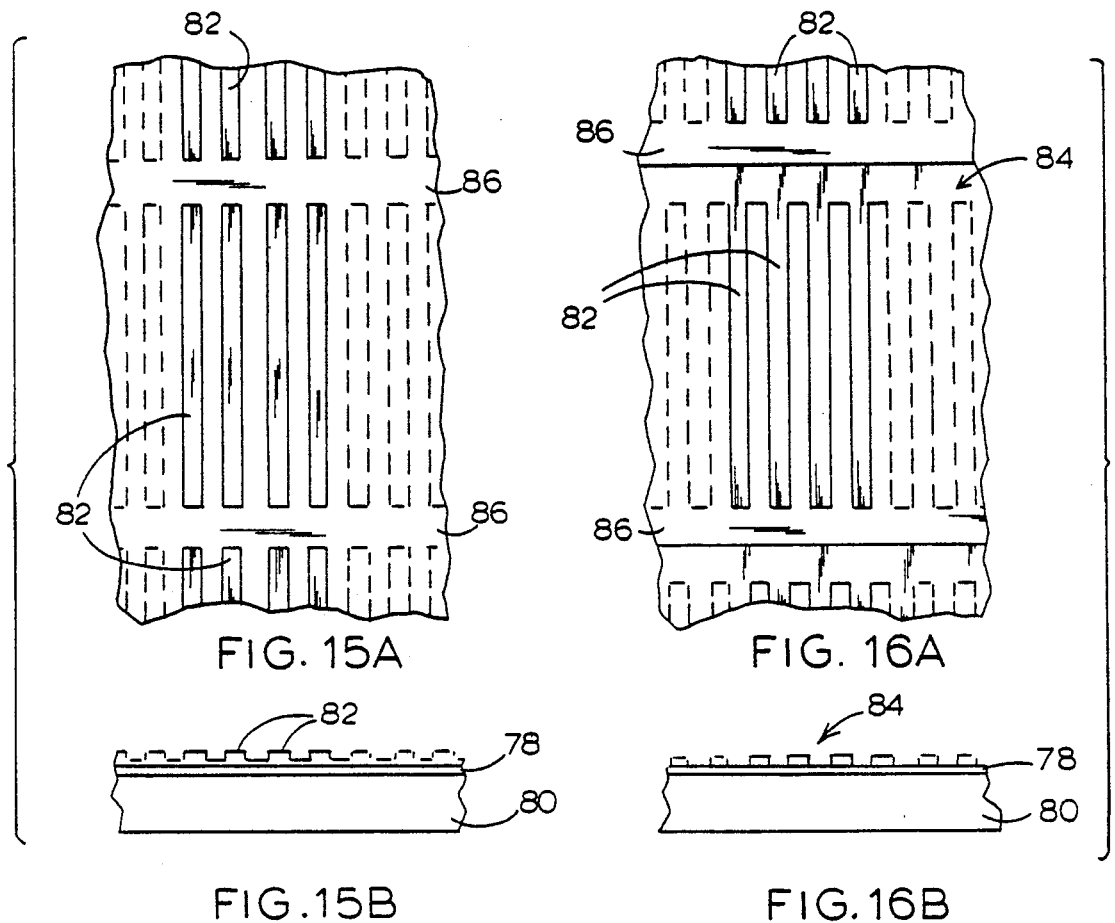
FIG. 15A  FIG. 16A
FIG. 15B  FIG. 16B
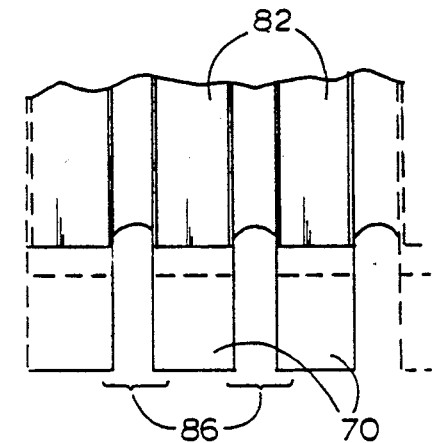
FIG. 17

MICRO-BURNISHING FLEX HEAD STRUCTURE

BACKGROUND AND SUMMARY OF THE INVENTION

In the manufacture of media for magnetic recording, considerable effort is directed at obtaining very smooth, and in the case of rigid media, very flat surfaces in order to minimize wear, and to maximize recording performance and reliability. Regarding rigid media, it is especially important to remove, or at least substantially limit the height of asperities, or projections, above the surface, since such asperities can give rise, directly or indirectly, through high-velocity impact, to catastrophic failure of the read/write head/disk interface. The acceptable height of any such asperities is, of course, related to the intended spacing between the head and the surface of a disk—the so-called flying height—during normal operation. Thus, as flying height is lowered in order to improve performance, the tolerable height of asperities decreases, and the task of creating such smooth surfaces becomes not only extremely important, but also very difficult and costly.

In the preparation of thin-film rigid media, conventional practice has been to roughen or "texturize" the surface of the media substrate prior to deposition of the magnetic storage layer(s) in order to reduce the eventual area of contact between the head and media surface at zero or low velocities, thereby to reduce "stiction", a tendency for a head to stick to the media surface. Such texturing processes occasionally result in the creation of asperities which protrude well above the general surface. As a consequence, subsequent deposition of the magnetic storage and protective overcoat layers, whether accomplished by sputtering or other processes, results in a conformal surface, thereby preserving or even accentuating the asperities. Asperities may also be created in the process of depositing these layers While the number and magnitude of such asperities can be reduced by appropriate process, materials and environmental controls, it is all but impossible to eliminate them completely—a task which is necessary to guarantee the most reliable operation. Consequently, various means and approaches have been used to remove or reduce the height of these asperities, including "kiss buffing" and/or burnishing the final media surface. The former technique employs an abrasive tape placed in very light contact with a spinning media disk. The latter is accomplished by flying a specially designed burnishing head above the media surface, at a head/media separation well below that at which a read/write head would normally fly. Asperities are thereby sheared off or plastically deformed. Since a conventional burnishing head is typically comparable in size and mass to a conventional read/write head, and further is subject to a comparable load, there is a risk that the process of burnishing may itself lead to a head crash, or damage to the media surface. Thus, the challenge is for the conventional burnishing head to fly high enough to avoid damaging contact with the media surface yet low enough to intercept and remove the asperities. A burnishing head accomplishes the delicate task just described when subsequent glide-height tests, employing a low-flying head fitted with a piezoelectric transducer, fails to indicate contact between the head and disk, in compliance with specified criteria.

As should be apparent from what has just been described, the risk of damaging a media surface in a burnishing operation increases rapidly and dramatically as the desired flying height (for ultimate intended performance) decreases.

The present invention recognizes the important need to eliminate the possibility of head crash during a burnishing operation in order to make substantial further progress in minimizing asperities and in enabling reliable operation, at very low flying heights, and ultimately in continuous sliding contact, when the surface of the finally burnished disk is used in conjunction with a read/write head. Catastrophic (crash caused) failure of the head/media interface results when, for a given relative velocity, the local pressure, i.e., the force per unit contact area, becomes very large, thereby giving rise to extreme local temperature, and to complex and irreversible physical and chemical reactions. The key, accordingly, is to limit the maximum possible pressure in any region of contact, resulting from applied load and inertial forces, to a level well below the threshold of failure.

Experience indicates that the area of contact between a typical slider and the surface of a disk is ordinarily a very small fraction of the footprint of the slider, because contact occurs at a corner, or along an edge, or with a particle contaminant. From this observation one can conclude that, to a first approximation, the area of contact is relatively independent of the size and mass of the slider. However, a relatively large slider with a relatively large mass requires a relatively large applied force for reasons of dynamic response. Thus, the maximum local contact pressure experienced by a very small, low-mass slider may be orders of magnitude lower than that for conventional sliders, with the result that catastrophic failure is extremely unlikely. Numerous tests have validated this logic. Of course, it is essential that the materials used in the construction of both the slider and the protective media overcoat, as well as in any lubricant employed, be chosen and processed optimally in order to provide maximum freedom from head crash.

On the basis of this reasoning, the present invention proposes and describes an integrated, unitary, micro-burnishing flexible (or flex) head structure, having very low mass, and designed to operate in continuous sliding contact at relatively high velocities, and capable of rapid dynamic response to media run-out. The latter property ensures that the cutting edge of the burnishing head remains in contact with the media surface, and that any asperity protruding from that surface will be sheared off.

In its most simplified form, the burnishing head structure of the present invention takes the form of an elongate flexure body, adjacent one end of which there is joined a low-mass abrader head formed of a suitable high-hardness material which exists either as a single crystal, or as a low-porosity, fine-grain-structure polycrystalline material. What might be thought of as the leading edge of the abrader head may, as will be explained below, occupy various angles and dispositions as the same is presented to the surface of a disk to be burnished, with this edge designed to be self-sharpening over a relatively long period of usage.

In a somewhat more involved embodiment of the invention, one that appears to offer particular utility in the mass manufacturing of disks, what is proposed is a comb-like array structure including a plurality of flexure bodies, capable of independent flexure, each carrying an abrader head at one end and joined adjacent their opposite ends to a common joinder structure.

A head structure constructed according to the invention is designed to operate with an effective load of about 20- to about 100-mg.

Details of these proposed constructions will now become more fully apparent as the description which follows is read in conjunction with the accompanying drawings.

DESCRIPTION OF THE DRAWINGS

FIGS. 11-17, inclusive, illustrate manufacturing techniques with FIG. 15(a)-15(b) illustrating the formation of single-flexure-body structures and FIG. 16(a)-16(b) illustrating the making of comb-like arrays.

DETAILED DESCRIPTION OF THE INVENTION

FIGS. 1-9, inclusive, herein illustrate four different types of single-flexure-body micro-burnishing head structures constructed in accordance with the present invention. These four types differ, chiefly, in the configuration of an employed abrader head, and those four types which are illustrated have been shown to offer good performances under a variety of conditions. The single-flexure-body units which are shown in these figures are illustrated and described initially because they represent the simplest forms of the proposed invention. In subsequent discussion with respect to FIG. 10, a multiple-flexure-body array structure is described, which offers great promise in the mass manufacture of media disks.

Figure 1:
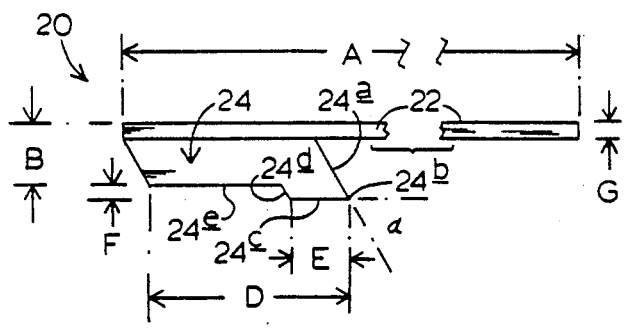
FIG. 1 is a fragmentary side elevation of a single-flexure-body micro-burnishing head structure constructed in accordance with one embodiment of the present invention, including an abrader head which has what will be referred to herein as a stepped construction.
Figure 2:
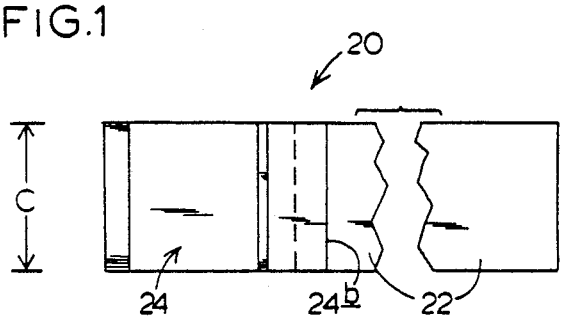
FIG. 2 is a fragmentary view taken from the bottom side of FIG. 1.

Turning attention first of all, then, to FIGS. 1 and 2, illustrated generally at 20 is one form of an integrated, unitary, micro-burnishing head structure constructed in accordance with the present invention. Structure 20 includes an elongate flexure body 22, to the underside of the left end of which in the figures is attached an abrader head 24. The materials that preferably are employed for these two components will be discussed shortly.

The overall length A of structure 20 is about 0.4-inches, the overall depth B about 0.005- to about 0.008-inches, and the overall width C about 0.01- to about 0.02-inches. The thickness G of flexure body 22 is about 0.001- to about 0.003-inches.

Abrader head 24 has what is referred to herein as a stepped construction, and is defined, as the same is seen in FIG. 1, by a leading face 24a which joins through a leading edge 24b with a short under surface 24c which, in turn, joins through a step 24d with a somewhat larger or longer under surface 24e. Surfaces 24c, 24e are referred to herein, respectively, as first and second, continuous, media-confronting facial expanse portions. The overall length D of the abrader head is about 0.015-inches, the length of surface 24c, E, is about 0.002- to about 0.005-inches, and the depth of the step, F, is about 0.001- to about 0.002-inches. The stepped bottom surfaces of abrader head 24 are formed by machining, with surface 24c lapped and polished flat. Surface 24a which joins with surface 24c to form leading edge 24b is created by lapping and polishing, and preferably lies at an angle $\alpha$ which resides in the range of about 30- to about 80-degrees. The mass of abrader head 24 is about 100-micrograms.

The effect of the stepped relief formed on the bottom side of head 24 is to limit the length and area of contact with a media surface as the head wears over its lifetime, and also to ensure that leading edge 24b, the cutting edge in the head, remains in contact with the media surface independent of medium run-out.

Figure 3:
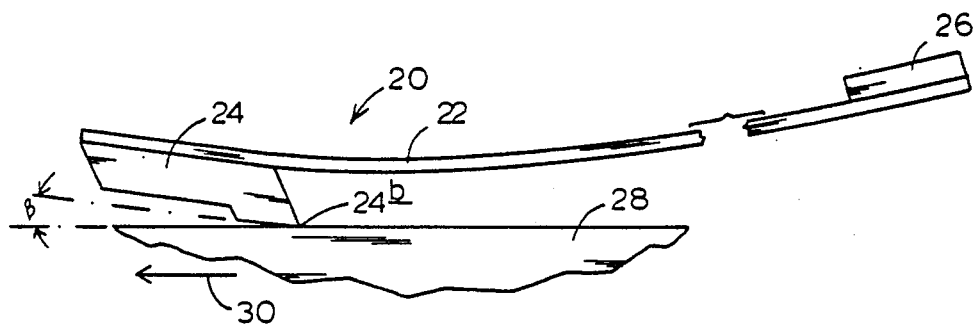
FIG. 3 is a side elevation illustrating the structure of FIGS. 1 and 2 in an operative condition relative to the surface of disk during a burnishing operation.

Referring now to FIG. 3 along with FIGS. 1 and 2, in operation, the right end of flexure body 22 in the figure is suitably attached to an actuator arm 26 of a burnishing/glide-height test instrument (not shown) in such a manner as to establish a proper load force in contact with the surface of a rigid medium 28. The effect of this attachment is to cause the flexure body to bend, deflect and establish a small angle $\beta$ between the top surface of the medium and abrader head surface 24c—thereby ensuring that edge 24b will always be in contact with the surface of the medium. The direction of medium motion is indicated by arrow 30 in FIG. 3.

In addition to the contact force that results from the way in which structure 20 is mounted, two other elements contribute to the overall force which the abrader head exerts on the surface of medium 28. First, the wedge-like gap which exists in the region indicated by angle $\beta$ between the surface of the medium and abrader head surface 24c creates a negative pressure in that region, and second, rake angle $\alpha$ creates a positive pressure. Preferably, the overall range of total contact force or effective load is between about 20- to about 100-milligrams.

According to the invention, the abrader head is designed to operate in continuous sliding contact with a medium surface, and accordingly, it is desirable that it be machined from materials that are very hard, dense and capable of forming and maintaining a sharp leading cutting edge. The latter implies a preference for a very fine grain ceramic (grain size less than about 5-$\mu$) or cermet material formed by a hot isostatic press process, e.g. $Al_2O_3TiC$, stabilized zirconia, boron nitride, etc. Monocrystalline materials, e.g., aluminum oxide, or structures created with a thin diamond-like carbon film on the contact and cutting surfaces will also serve well as burnishing abrader heads.

Tests with micro-burnishing heads formed from $Al_2O_3TiC$ in high velocity contact with carbon-coated thin-film media, and with relatively large applied loads, have demonstrated a capability for rapidly removing asperities without having any observable effect on, or causing damage to, the surface of media. Further demonstrating the immunity of media surfaces to wear or damage under these conditions, it has been observed that the contact surface of micro-burnishing heads formed in accordance with the invention results in continuously self-sharpening, highly polished wearing at the leading or cutting edges, despite the extreme hardness of the material making up the abrader heads.

Figure 4:
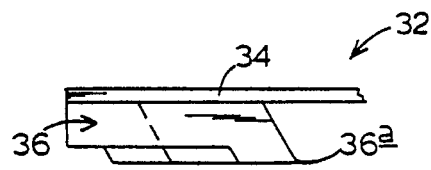
FIG. 4 is a fragmentary side elevation, like FIG. 1, of another embodiment of the present invention including a stepped-type abrader head including a plow-angle leading edge.
Figure 5:
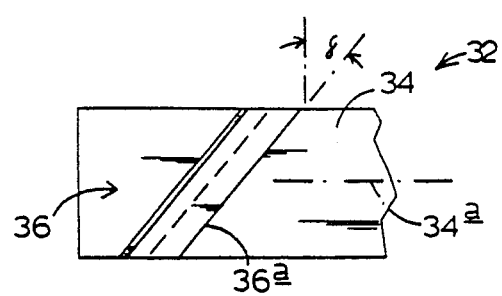
FIG. 5 is a view taken from the bottom side of FIG. 4.

Looking now to FIGS. 4 and 5, here there is shown at 32 a micro-burnishing flex head structure which is very similar to structure 20 except that its flexure body 34 carries an abrader head 36 which has what is referred to herein as a plow angle shown in FIG. 5 at $\delta$. Angle $\delta$ is typically in the range of about 30- to about 40-degrees, and results in the leading edge 36a in head 36 residing off-normal relative to the longitudinal axis 34a of flexure body 34.

Figure 6:
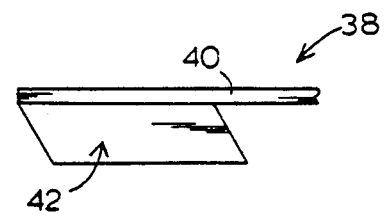
FIGS. 6 and 7 are fragmentary side and bottom views, respectively, like FIGS. 4 and 5, illustrating yet another embodiment of the invention including a non-stepped, non-plow-angle abrader head.
Figure 7:
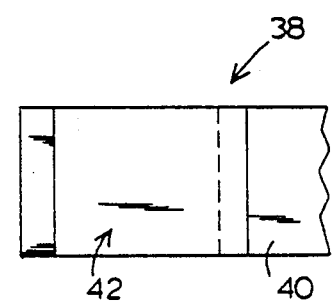

In FIGS. 6 and 7 there is illustrated a micro-burnishing flex head structure 38 including a flexure body 40 and an abrader head 42. Abrader head 42 is similar to previously described head 24, except that it does not include the stepped bottom-surface configuration of the latter.

Figure 8:
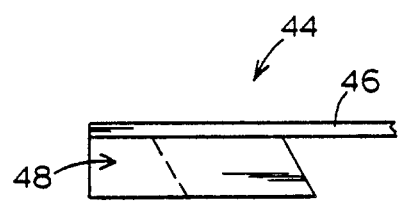
FIGS. 8 and 9 are fragmentary side and bottom views, respectively, of still another embodiment of the present invention including a non-stepped, plow-angle abrader head.
Figure 9:
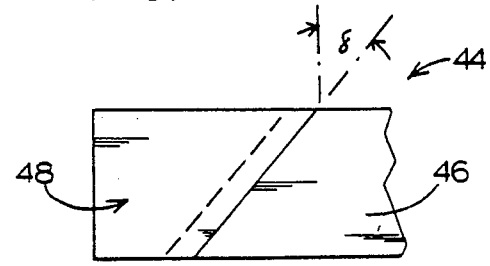

Focusing attention on FIGS. 8 and 9, here one sees yet another modified form of micro-burnishing flex head structure 44 including a flexure body 46 and an abrader head 48. Head 48 is like previously mentioned head 42 with the exception that it is formed with a plow angle $\delta$ (see FIG. 9).

The plow angle configurations which are shown in FIGS. 4, 5, 8 and 9 facilitate the removal of debris from burnishing head/media surface interfaces.

Figure 10:
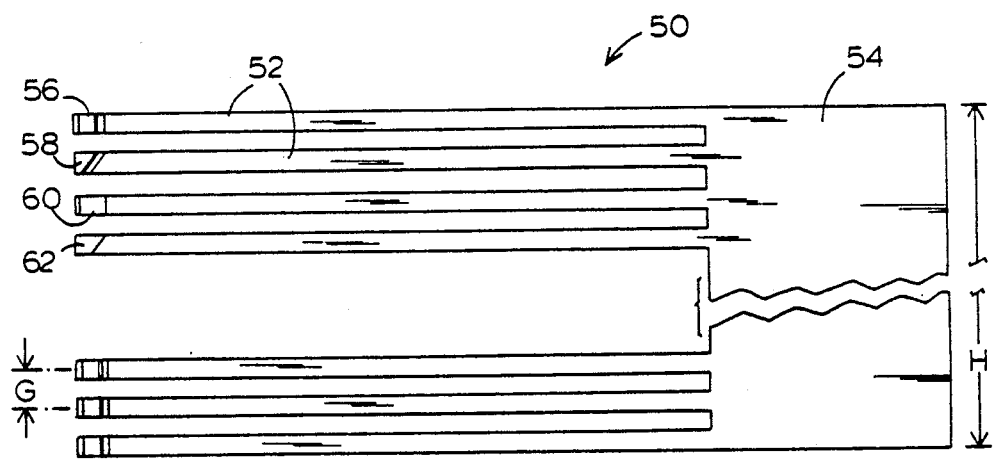
FIG. 10 is a fragmentary bottom view of a multi-flexure-body micro-burnishing head structure, with each flexure body carrying, adjacent a free end, an abrader head, and joined adjacent opposite ends through a common joinder structure. With respect to FIG. 10, a certain liberty has been taken, in that, as will be explained, certain different flexure bodies are shown joined with different ones of the four types of abrader heads just mentioned above, for the purpose of illustrating the point that a unit like that shown in FIG. 10 can be made, selectively, to include any different one of the several proposed abrader heads. A given unit, like that shown in FIG. 10, would, of course, be constructed to include but one only of a selected type of abrader head.

FIG. 10 shows fragmentary at 50 a multi-flexure-body micro-burnishing head structure in the form of a comb-like array including flexure bodies, such as those shown at 52 which are free adjacent their left ends, and which are joined adjacent their right ends through a common joinder structure 54.

Seven flexure bodies are illustrated in FIG. 10, with their left ends carrying abrader heads like those discussed earlier. In particular, and simply to illustrate the point that structure 50 may be formed to include any one of the several different types of abrader heads so far described, and progressing downwardly from the top of FIG. 10, the first flexure body carries an abrader head 56 which is like previously mentioned head 24, the next-encountered flexure body carries an abrader head 58 which is like previously mentioned head 36, the next-encountered flexure body carries an abrader head 60 which is like head 42, and the fourth-encountered flexure body carries an abrader head 62 which is like previously mentioned head 48. The last three flexure bodies shown in FIG. 10 carry abrader heads like head 56.

An important advantage of such an array structure over a single-flexure-body structure lies in the fact that an array can span the whole or a large portion of the operating surface of a medium, thereby enabling rapid, economical and effective removal of surface asperities in the shortest possible time. Such arrays typically require only a relatively small stroke or oscillation of supporting actuator structure. For example, arrays, like array 50, with a pitch (center-to-center) spacing of abrader heads, shown at G at FIG. 10, of about 0.015-inches and an overall span width shown at H of about 1-inch or more may readily be fabricated.

Shifting attention now to the remaining drawing figures as a collection, a procedure for manufacturing micro-burnishing flex head structures and arrays thereof will now be described.

Figure 11:
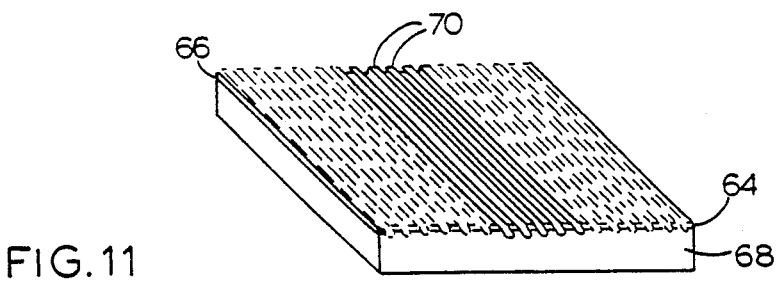
Figure 12:
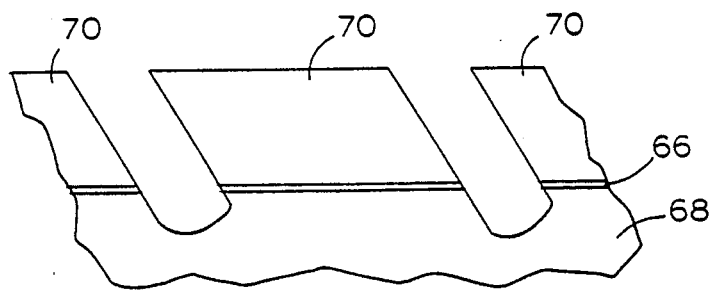

A wafer 64 (FIG. 11) of hot isostatic pressed $Al_2O_3$-TiC about 0.01-inches thick and two inches square is glued through a layer 64 to a ceramic substrate 68, and sliced with a tilted arbor saw into bars 70. This is shown in perspective in FIG. 11 and fragmentarily in end elevation in FIG. 12. The long dimension of the resulting bar-end parallelogram (see particularly FIG. 12) is about 0.015-inches.

Figure 13:
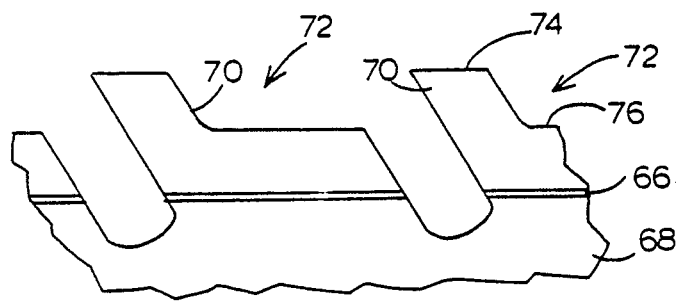
Figure 14:
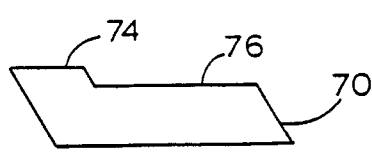

Relief cuts 72 (see FIG. 13) are then machined, resulting in the cross-sectional shape shown in FIG. 13. The upper surface 74 is next lapped and polished resulting in an overall thickness of about 0.004- to about 0.006-inches and a step of about 0.001- to about 0.002-inches to the relieved surface shown at 76. Bars 70 thereafter removed from substrate 68, have cross sections like that shown in FIG. 14.

Moving on to FIGS. 15 and 16 (two views each), the former illustrates the formation of single-flexure-body structures, and the latter illustrates the making of comb-like arrays. A flexure foil 78 about 0.001- to about 0.003-inches thick, and having suitable elastic properties, is glued to a ceramic substrate 80 and photochemically etched into numerous flexures or flexure bodies 82 to form individual bodies (FIG. 15) or comb-like flexure body arrays 84 (FIG. 16) joined together along one set of ends. Beryllium-copper or heat-treated stainless steel, are examples of materials suitable for the fabrication of the flexure bodies. These bodies typically have the dimensions expressed for them in the description earlier, and in the cases of arrays, such as those shown in FIG. 16, about 0.1-inches of non-etched common stock forms the previously mentioned joinder structure which unifies an array of bodies.

Substrate 80 is now sliced into bars on the surfaces of which are rows of isolated flexures of 82 (drawn from the structure illustrated in FIG. 15), or arrays of flexure bodies (drawn from the structure shown in FIG. 16)—such slicing being made in the streets 86 which separate the rows of flexures (see the upper views in FIGS. 15 and 16).

The previously mentioned bars 70 which will ultimately form abrader heads like head 24 are suitably bonded to the appropriate ends of the flexure bodies. In final machining operations, bars 70 are sliced to separate, as appropriate, the independent flexure bodies or arrays of such bodies (see FIG. 17), and the finished structures are removed from the associated supporting substrate.

Accordingly, various embodiments of the structures proposed by the present invention have been illustrated and described, which structures are capable of performing in accordance with the features and advantages expressed earlier herein. Of course, variations and modifications may be made without departing from the spirit of the invention.

It is claimed:

1. An integrated, unitary micro-burnishing head structure for use with the surface of rigid magnetic recording media comprising an elongate flexure body, and an abrader head joined to said body adjacent one end thereof, adapted for abrasive, sliding contact with such a surface, said head structure having an overall length of about 0.4-inches, an overall width of about 0.01- to about 0.02-inches, a flexure-body thickness of about 0.001- to about 0.003-inches, an abrader-head thickness of about 0.004-inches, and an abrader-head mass of about 100-micrograms.

2. An integrated, unitary micro-burnishing head structure for use with the surface of rigid magnetic recording media comprising an elongate flexure body having a length of about 0.4-inches, a width of about 0.01- to about 0.02-inches, a thickness of about 0.001- to about 0.003-inches, and an abrader head joined to said body adjacent one end thereof, adapted for abrasive sliding contact with such a surface, said abrader head having a length of about 0.015-inches, an abrader head thickness of about 0.004-inches, an abrader head width substantially equaling that of said flexure body, and an abrader head mass of about 100-micrograms.

3. The head structure of claim 1 which is designed to operate with an effective load in the range of about 20- to about 100-mg.

4. An integrated, unitary micro-burnishing head structure for use with the surface of rigid magnetic recording media comprising an elongate flexure body, and an abrader head joined to said body adjacent one end thereof, including a leading edge adapted to lie generally in the plane of such a surface for abrasive sliding contact with the same, said leading edge being self sharpening by virtue of the fact that the same is defined by the intersection between a leading planar face and a bottom planar surface in the head structure which intersect at an acute angle subtending between about 30- and about 80-degrees.

5. The head structure of claim 4, wherein said leading edge resides at an angle which is off-normal relative both to the long axis of said flexure body and to the relative direction of travel of such a medium.

6. The head structure of claim 4, wherein said abrader head comprises a high-hardness material formed as a single crystal.

7. The head structure of claim 4, wherein said abrader head is formed of a high-hardness, low-porosity polycrystalline material having a fine-grain structure characterized by a grain size of about 5-microns or less.

8. An integrated, unitary, generally comb-like micro-burnishing head structure for use with a single side surface of rigid magnetic recording media comprising plural, elongate, generally parallel, side-by-side positioned, independently flexible flexure bodies joined adjacent one set of ends to a common joinder structure, and free adjacent the opposite set of ends, and for each body, an abrader head joined thereto adjacent the body's said free opposite end, adapted for abrasive, sliding contact with such a surface.

9. The head structure of claim 8, wherein each flexure body has an overall length of about 0.4-inches, an overall width of about 0.01- to about 0.02-inches, a thickness of about 0.001- to about 0.003-inches, and each abrader head has a width substantially equaling that of said flexure body, a thickness of about 0.004-inches and a mass of about 100-micrograms.

10. The head structure of claims 8 or 9, wherein each combined/associated flexure body and abrader head is designed to operate with an effective load in the range of about 20- to about 100-mg.

11. The head structure of claim 8, wherein each abrader head has a self-sharpening leading edge.

12. The head structure of claim 11, wherein each leading edge is formed by the intersection of substantially planar faces which intersect, nominally, at an angle that lies within the range of about 30° to about 80°.

13. The head structure of claims 11 or 12, wherein said leading edge resides at an angle which is off-normal relative both to the long axis of said flexure body and to the relative direction of travel of such a medium.

14. The head structure of claims 8, 11 or 12, wherein said abrader head comprises a high-hardness material formed as a single crystal.

15. The head structure of claims 8, 11 or 12, wherein each abrader head is formed of a high-hardness, low-porosity polycrystaline material having a fine-grain structure characterized by a grain size of about 5-microns or less.

16. An integrated, unitary micro-burnishing head structure for use with the surface of rigid magnetic recording media comprising an elongate flexure body, and an abrader head joined to said body adjacent one end thereof, adapted for abrasive, sliding contact with such a surface, said abrader head including a first, continuous, media-confronting facial expanse portion extending away from the structure's region of intended contact with such a surface, said portion, with the structure in operative condition relative to such a surface, diverging from the surface progressing in a direction away from said region.

17. The head structure of claim 16, wherein said abrader head further includes a second, continuous, media-confronting facial expanse portion that joins through a step with said first facial expanse portion, and which is disposed to confront such a surface in a manner more remote than said first facial expanse portion.

18. An integrated, unitary micro-burnishing head structure for use with the surface of rigid magnetic recording media comprising an elongate flexure body, and an abrader head joined to said body adjacent one end thereof including a self-sharpening leading edge adapted for abrasive, sliding contact with such a surface, said abrader head including a first, continuous media-confronting facial expanse portion extending away from the structure's region of intended contact with such a surface, said portion, with the structure in operative condition relative to such a surface, diverging from the surface progressing in a direction away from said region.

19. The head structure of claim 18, wherein said abrader head further includes a second, continuous, media-confronting facial expanse portion that joins through a step with said first facial expanse portion, and which is disposed to confront such a surface in a manner more remote than said first facial expanse portion.

20. An integrated, unitary micro-burnishing head structure for use with the surface of rigid magnetic recording media comprising an elongate flexure body, and an abrader head joined to said body adjacent one end thereof including a self-sharpening leading edge formed by the intersection of substantially planar faces which intersect, nominally, at an angle that lies within the range of about 30- to about 80-degress adapted for abrasive, sliding contact with such a surface, said abrader head including, in addition, a first, continuous, media-confronting facial expanse portion extending away from the structure's region of intended contact with such a surface, said portion, with the structure in operative condition relative to such a surface, diverging from the surface progressing in a direction away from said region.

21. The head structure of claim 20, wherein said abrader head further includes a second, continuous, media-confronting facial expanse portion that joins through a step with said first facial expanse portion, and which is disposed to confront such a surface in a manner more remote than said first facial expanse portion.

22. An integrated, unitary micro-burnishing head structure for use with the surface of rigid magnetic recording media comprising plural, elongate, generally parallel, independently flexible flexure bodies joined adjacent one set of ends to a common joinder structure, and free adjacent the opposite set of ends, and for each body, an abrader head joined thereto adjacent the body's said free opposite end, adapted for abrasive, sliding contact with such a surface, each abrader head including a first, continuous, media-confronting facial expanse portion extending away from the region of intended contact with such a surface, said portion, with the structure in operative condition relative to such a surface, diverging from the surface progressing in a direction away from said region.

23. An integrated, unitary micro-burnishing head structure for use with the surface of rigid magnetic recording media comprising plural, elongate, generally parallel, independently flexible flexure bodies joined adjacent one set of ends to a common joinder structure, and free adjacent the opposite set of ends, and for each body, an abrader head having a self-sharpening leading edge joined to the body adjacent the body's said free opposite end, adapted for abrasive, sliding contact with such a surface, each abrader head including a first, continuous, media-confronting facial expanse portion extending away from the region of intended contact with such a surface, said portion, with the structure in operative condition relative to such a surface, diverging from the surface progressing in a direction away from said region.

24. An integrated, unitary micro-burnishing head structure for use with the surface of rigid magnetic recording media comprising plural, elongate, generally parallel, independently flexible flexure bodies joined adjacent one set of ends to a common joinder structure, and free adjacent the opposite set of ends, and for each body, an abrader head including a self-sharpening leading edge formed by the intersection of substantially planar faces which intersect, nominally, at an angle that lies within the range of about 30- to about 80-degrees joined adjacent the body's said free opposite end, adapted for abrasive, sliding contact with such a surface, each abrader head including a first, continuous, media-confronting facial expanse portion extending away from the region of intended contact with such a surface, said portion, with the structure in operative condition relative to such a surface, diverging from the surface progressing in a direction away from said region.

25. The head structure of claim 22, wherein each abrader head further includes a second, continuous media-confronting facial expanse portion which joins through a step with said first facial expanse portion, and which is disposed to confront such a surface in a manner more remote than said first facial expanse portion.

26. The head structure of claim 23, wherein each abrader head further includes a second, continuous media-confronting facial expanse portion which joins through a step with said first facial expanse portion, and which is disposed to confront such a surface in a manner more remote than said first facial expanse portion.

27. The head structure of claim 24, wherein each abrader head further includes a second, continuous media-confronting facial expanse portion which joins through a step with said first facial expanse portion, and which is disposed to confront such a surface in a manner more remote than said first facial expanse portion.

* * * * *